United States Patent
Endt et al.

(10) Patent No.: US 9,151,653 B2
(45) Date of Patent: Oct. 6, 2015

(54) GAS METER WITH INTEGRATED GAS SHUT-OFF VALVE

(75) Inventors: Joerg Endt, Dresden (DE); Joerg Gassmann, Dresden (DE); Majid Bakhshi, Berlin (DE); Torsten Ettrich, Dresden (DE)

(73) Assignee: JOHNSON ELECTRIC S.A., Murten (CH)

( * ) Notice: Subject to any disclaimer, the term of this patent is extended or adjusted under 35 U.S.C. 154(b) by 169 days.

(21) Appl. No.: 13/587,086

(22) Filed: Aug. 16, 2012

(65) Prior Publication Data

US 2013/0042934 A1    Feb. 21, 2013

(30) Foreign Application Priority Data

Aug. 17, 2011  (DE) .......................... 10 2011 110 379

(51) Int. Cl.
| | |
|---|---|
| *G01F 15/00* | (2006.01) |
| *F16K 5/10* | (2006.01) |
| *F16K 5/06* | (2006.01) |
| *F16K 31/04* | (2006.01) |
| *G01F 15/06* | (2006.01) |

(52) U.S. Cl.
CPC ............ *G01F 15/005* (2013.01); *F16K 5/0636* (2013.01); *F16K 5/0642* (2013.01); *F16K 5/0652* (2013.01); *F16K 5/0689* (2013.01); *F16K 5/103* (2013.01); *F16K 31/041* (2013.01); *G01F 15/00* (2013.01); *G01F 15/063* (2013.01); *Y10T 137/8376* (2015.04)

(58) Field of Classification Search
USPC ................ 251/129.11, 180, 208, 249.5, 292, 251/315.07, 315.08, 315.09, 315.16, 251/129.12, 286, 288; 174/663
See application file for complete search history.

(56) References Cited

U.S. PATENT DOCUMENTS

| | | | | |
|---|---|---|---|---|
| 2,690,894 | A | * | 10/1954 | Blevans ........................ 251/163 |
| 3,587,315 | A | | 6/1971 | Burrett |
| 3,862,739 | A | | 1/1975 | Fujiwara |
| 4,046,350 | A | | 9/1977 | Massey et al. |
| 5,261,268 | A | | 11/1993 | Namba |
| 5,263,684 | A | * | 11/1993 | McGuire ........................ 251/294 |
| 5,269,344 | A | * | 12/1993 | McHugh ........................ 137/557 |
| 5,540,414 | A | * | 7/1996 | Giordani et al. ............... 251/174 |
| 5,566,923 | A | * | 10/1996 | Ennis et al. ............... 251/315.04 |
| 5,567,875 | A | | 10/1996 | Adams |
| 6,371,440 | B1 | * | 4/2002 | Genga et al. ............. 251/129.03 |
| 6,470,741 | B1 | | 10/2002 | Fathollahzadeh |
| 6,539,899 | B1 | | 4/2003 | Piccirilli et al. |

(Continued)

FOREIGN PATENT DOCUMENTS

| | | |
|---|---|---|
| CN | 2752562 Y | 1/2006 |
| DE | 3806261 A1 | 9/1989 |
| DE | 4007279 A1 | 9/1991 |
| DE | 4230341 A1 | 3/1994 |

(Continued)

*Primary Examiner* — William McCalister
*Assistant Examiner* — Ian Paquette
(74) *Attorney, Agent, or Firm* — Muncy, Geissler, Olds & Lowe, P.C.

(57) ABSTRACT

A gas meter with integrated gas shut-off valve has a housing with a gas inlet and a gas outlet. A device to record the gas flow, a meter mechanism, a gas shut-off valve and optionally a pressure reducer are positioned in a gas flow path between the gas inlet and the gas outlet. The gas shut-off valve is an electrically operated valve with a spherical or cylindrical valve element.

18 Claims, 8 Drawing Sheets

(56) References Cited

U.S. PATENT DOCUMENTS

| | | | |
|---|---|---|---|
| 6,994,309 B2 * | 2/2006 | Fernandez-Sein | 251/129.04 |
| 7,182,314 B2 * | 2/2007 | Harvey et al. | 251/249.5 |
| 7,875,797 B2 * | 1/2011 | Moser | 174/50 |
| 8,113,484 B2 * | 2/2012 | Hostetter et al. | 251/180 |
| 8,281,798 B2 * | 10/2012 | Dalluge et al. | 137/15.22 |
| 2010/0207046 A1 * | 8/2010 | Wenchell et al. | 251/315.1 |
| 2010/0289667 A1 | 11/2010 | Turgeon et al. | |

FOREIGN PATENT DOCUMENTS

| | | |
|---|---|---|
| DE | 692 00 871 T2 | 7/1995 |
| DE | 10129300 A1 | 2/2002 |
| DE | 103 06 094 A1 | 9/2003 |
| DE | 20 2006 001 060 U1 | 6/2006 |
| EP | 0843287 B1 | 5/1998 |
| EP | 1936750 A1 | 6/2008 |

* cited by examiner

GAS METER WITH INTEGRATED GAS SHUT-OFF VALVE

CROSS REFERENCE TO RELATED APPLICATIONS

This non-provisional patent application claims priority under 35 U.S.C. §119(a) from Patent Application No. 10 2011 110 379.5 filed in Germany on Aug. 17, 2011.

FIELD OF THE INVENTION

This invention relates to a gas meter and in particular, to a gas meter with an integrated gas shut-off valve.

BACKGROUND OF THE INVENTION

Gas meters are measurement devices to record the amount of gas passed through per unit time. The area of use of gas meters is not restricted to just domestic or industrial gas supply, but also exact amount determination in laboratory investigations. For special applications gas meters are equipped with interfaces or potential-free contacts, which permits remote query of meter states or further processing of the measured consumption.

A modular gas meter is already known for this purpose from EP 0843287 B1, which has a base meter unit, an additional component, a gas closure valve, a gas flow meter arrangement and a first communication interface to transmit control data from or to the valve control system. The base meter unit is then configured so that it can be combined operationally with the additional component in order to expand the functions of the meter in so doing. The additional components include a component control system, set up so that it can control the functionality. The component control system has a second communication interface, via which communication signals are sent to control the base meter unit. The characteristic of this invention is that the additional component is arranged so that it calculates a closure-volume index which is sent to the base meter unit, which compares this value with the actual volume index volume and is arranged so that it trips the closure valve for interruption of gas supply as soon as the current volume index value reaches or surpasses the closure volume index value.

DE 101 293 00 A1 discloses a mass flow meter-detector, especially gas meter, as well as a method for data exchange. A gas meter includes a mass flow meter-detector, a control and a display. The gas meter can also be equipped with a card reader and a valve. The mass flow-detector is based on a sensor element, which is integrated on a semiconductor component together with a digital and analog evaluation. Since the mass flow rate and not the flow rate or volume of the consumed gas is measured, a value independent of pressure is obtained, which is essentially determined by the calorific value of the gas.

A gas meter and a method for determination of a consumed amount of gas are known from U.S. Pat. No. 6,470,741. The gas meter is characterized by a mass flow rate detector to measure the mass flow rate of a gas flowing through a main channel and also with means for integration of the mass flow rate over time.

A connection device for gas meters can be deduced from DE 4007279 C2. The connection device includes a shut-off valve, pressure regulator and an overpressure safety valve, which are connected in a feed line. A connection piece with three connectors is connected to the feed line, a first connector of which is provided for connection of the gas meter, a second for connection of the consumer and the third connection is provided with a gas shut-off valve, whose shut-off element is adjustable by means of a rotatable pin in a closed and open position. A characteristic of this invention is that the rotary pin is provided with a through hole, which runs axially in the rotary pin and is connected gastight to a removable closure or a closure being opened.

A device to secure against unauthorized gas removal from pressurized gas lines is also known from DE 38006261 C2, from which the gas meter is disassembled. A characteristic for this invention is that a plug inserted into the gas line is provided with at least one rubber hollow cylinder or ring, which is sealed against the walls of the gas line, imparts a fixed seat to the plug and is configured so that it can only be removed with a special tool.

A dry gas meter is known from U.S. Pat. No. 3,587,315, which includes a number of measurement chambers and a single valve. This valve always prevents direct gas flow between an inlet and an outlet. A working cycle is run, during which each of the individual chambers of the gas meter is connected for a specified time via a passage opening specially assigned to it to an inlet and for additional time to an outlet and for the remaining time of the work cycle is sealed relative to the inlet, the outlet and all other chamber passages. A characteristic of this invention is that the valve has a valve slide, which simultaneously rotates and moves in translational fashion in the same plane to execute an oscillating movement.

The gas meters known from the prior art have the drawback that, on the one hand, the shut-off valves present as separate components are connected in front of the gas meter and can therefore also be operated by unauthorized third parties. In the past this has often meant that consumers have replaced line sections, bypassing the gas meter and therefore enjoyed free and therefore illegal gas supply. In solutions of gas meters with integrated shut-off valves, on the hand, high pressure losses are registered, since these shut-off valves are functionally optimized but are not optimized in terms of flow.

SUMMARY OF THE INVENTION

Hence there is a desire for an improved gas meter with an integrated gas shut-off valve.

Accordingly, in one aspect thereof, the present invention provides a gas meter with an integrated gas shut-off valve, comprising: a housing, having a gas inlet and a gas outlet, a gas flow meter mechanism, and a gas shut-off valve, the meter mechanism and the shut-off valve being arranged in a gas flow path between the gas inlet and the gas outlet, wherein the gas shut-off valve is designed as an electrically operated valve with a spherical or cylindrical valve element.

Optionally, the gas meter may include a pressure reducer.

Preferably, the gas shut-off valve has a valve unit (V) comprising a valve body and the sealing element disposed therein, drive unit (A) having a motor, and a connection unit (S), units (V, A, S) being connectable to each other in modular fashion and separable from each other.

Preferably, the drive unit (A) has a gear mechanism, which is connected as a modular unit with the valve body after connection of the valve element with the drive unit (A).

Preferably, the gear mechanism comprises a worm fitted to a shaft of the motor, and a worm gear in mesh with the worm.

Preferably, the drive unit (A) has a switch and at least one trip cam arranged to operate the switch to recognize the open and closed position of the valve element.

Preferably, the motor and the switch of the drive unit (A) are connected with a flat conductor.

Preferably, the drive unit has a coupling piece having two connectors for driving the valve element and the valve body has two openings through which the two connectors extend to engage the vale element in shape-mated manner, the openings being arranged to form stops for the connectors preventing rotation of the valve element beyond 90°.

Preferably, only one sealing element is provided to seal the valve element to the valve body.

Preferably, the sealing element is a lip seal.

Preferably, at least one of the valve body and the valve element is made from plastic. This allows the valve to be used within an explosion-hazardous atmosphere.

Preferably, the flat conductor has electronic components that prevent the formation of an igniting spark.

Preferably, the flat conductor extends through an opening in an outer wall of the housing and the opening is sealed by a fluid-tight cable bushing.

Preferably, the opening has a shaping forming a depression on a first end of the opening, the fluid-tight cable bushing passes through the opening and comprises two profile supports with a first flange having snap-on elements and a second flange angled from it, in which in the assembled state:

a. the first flanges of the profile supports extend symmetric to each other in the direction of the longitudinal axis of the flat conductor and enclose the flat conductor sandwich-like on both sides with surface contact;
b. to form a first fixation point the snap-on elements of the first flange are mounted v-shaped with the V opening pointing towards the opening and snapped directly onto the first end of the opening;
c. to form a stop surface the second flanges of the profile supports extend fin-like laterally beyond a second end of the opening; and
d. a fluid-tight potting mass covers the fixation point positioned in the area of the depression.

Preferably, each first flange of the fluid-tight cable bushing has more than one snap-on element to form at least one additional fixation point.

Preferably, the fluid-tight cable bushing has spacers to vary the design height of the cable bushing and to protect the flat conductor, the spacers are fixed to the first flanges and the flat conductor by connection elements and/or glue.

Preferably, a wireless receiver or a wireless receiver and transmitter, which exchange information with a wireless receiver and/or wireless transmitter situated outside the gas meter, is provided to enable wireless communication and control of the gas meter.

Preferably, the electronic components for the wireless receiver and/or transmitter are arranged directly on the flat conductor or integrated in it.

Preferably, an internal power supply, in the form of a battery, is provided for autonomous operation of the gas meter.

This modular design of selectable connections, valve and drive units or modules, permits the valves to be adjusted cost-effectively to market and customer requirements and new specifications. The modular design, in particular, makes it possible to have a variety of valve systems that can be installed in plug-in fashion from one or more of the same and different modules, like valve unit/drive unit module or valve unit/connection piece, according to the requirements. This design also leads to simple and rapid replacement of interfaces and the drive unit, which significantly reduces the time and cost expenditure in maintenance work and increases suitability for repair. A change in power supply, normative classification of the application and actuator selection adjusted to it are among the possible reasons for change, as well as different tightness conditions. Adjustment of the valve element for different volumetric flow rates and pressure drops for different ball diameters and sizes of the internal space of the valve housings would be conceivable. By simple replacement of the connection, installation on any interface is possible.

According to a preferred embodiment of the valve, the shape-mated connections are designed as mating snap-on elements, which engage one in the other during closure and form a shape-mated connection in so doing. Positioning of a module or closure of the module therefore occurs through a translational movement of a module onto the other module. It is particularly advantageous if a module is merely mounted or clipped from above onto another module, for example, the valve housing. This permits automatic closure of both modules.

According to an advantageous embodiment the shape-mated connection of the modules includes at least two, preferably three or more snap-on element pairs, since several snap-on element pairs permit multiple securing and therefore contribute to more reliable closure of the modules. Snap-on element pairs are understood to mean two snap-on elements that mutually produce a shape-mated connection. However, it is conceivable, under some circumstances, to understand snap-on element pairs to mean a number of snap-on elements which can be viewed merely as a snap-on element pair owing to their similar configuration and the same method of action.

Another possibility for shape-mated connection of the modules is offered by a bayonet closure in which connection occurs via an insertion and rotary movement. The two parts being connected are connected by insertion one in the other and opposite rotation and also separated again. A combination of snap-on and bayonet connections is also conceivable.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 11:
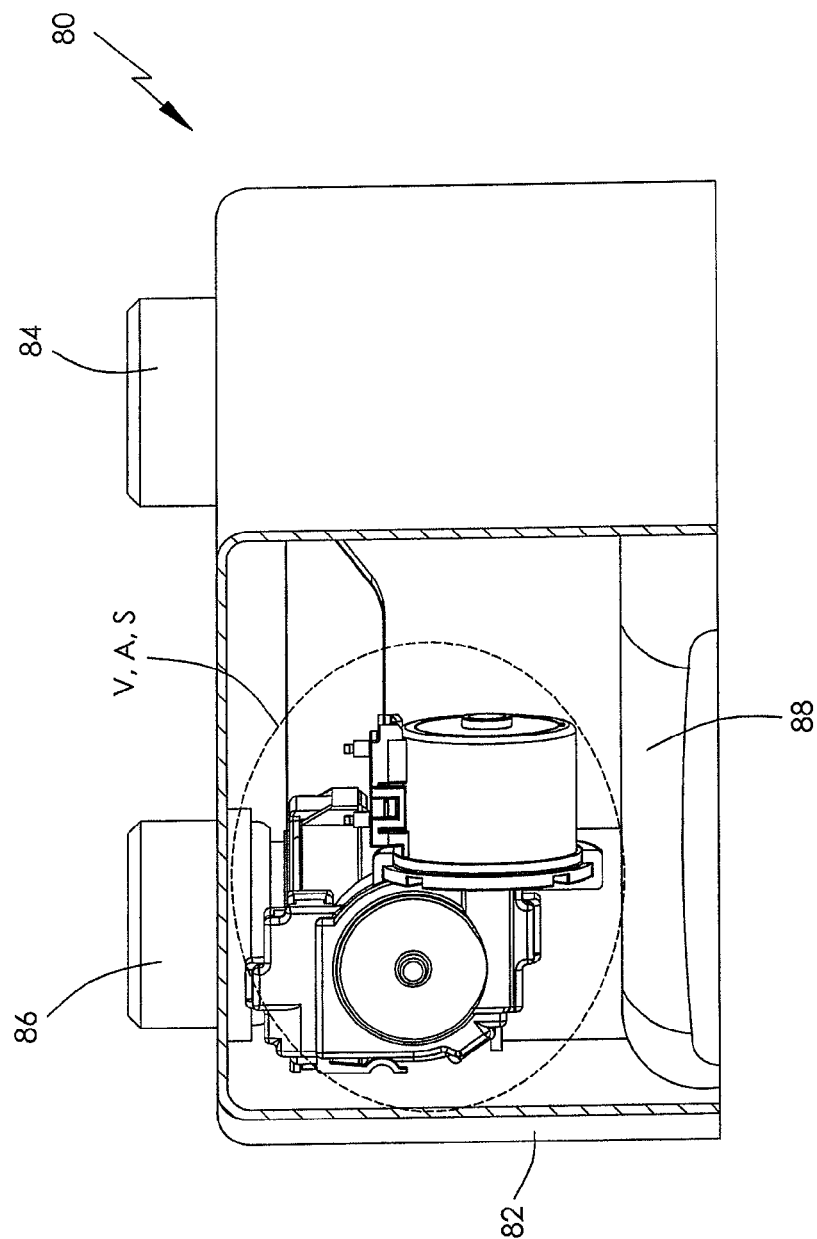
FIG. 11 is a schematic view of the gas meter of the preferred embodiment, incorporating the gas valve of FIG. 1.

FIG. 11 is a schematic view of a gas meter 80. The gas meter 80 has a housing 82 with a gas inlet 84 and a gas outlet 86. An optional device (not shown) to detect the gas flow, a meter 88 and a gas shut-off valve 10 are positioned in a gas flow path between the gas inlet 84 and the gas outlet 86 are arranged within housing 82. The gas shut-off valve 10 according to the invention is an electrically operated valve with a spherical or cylindrical valve element.

Figure 1:
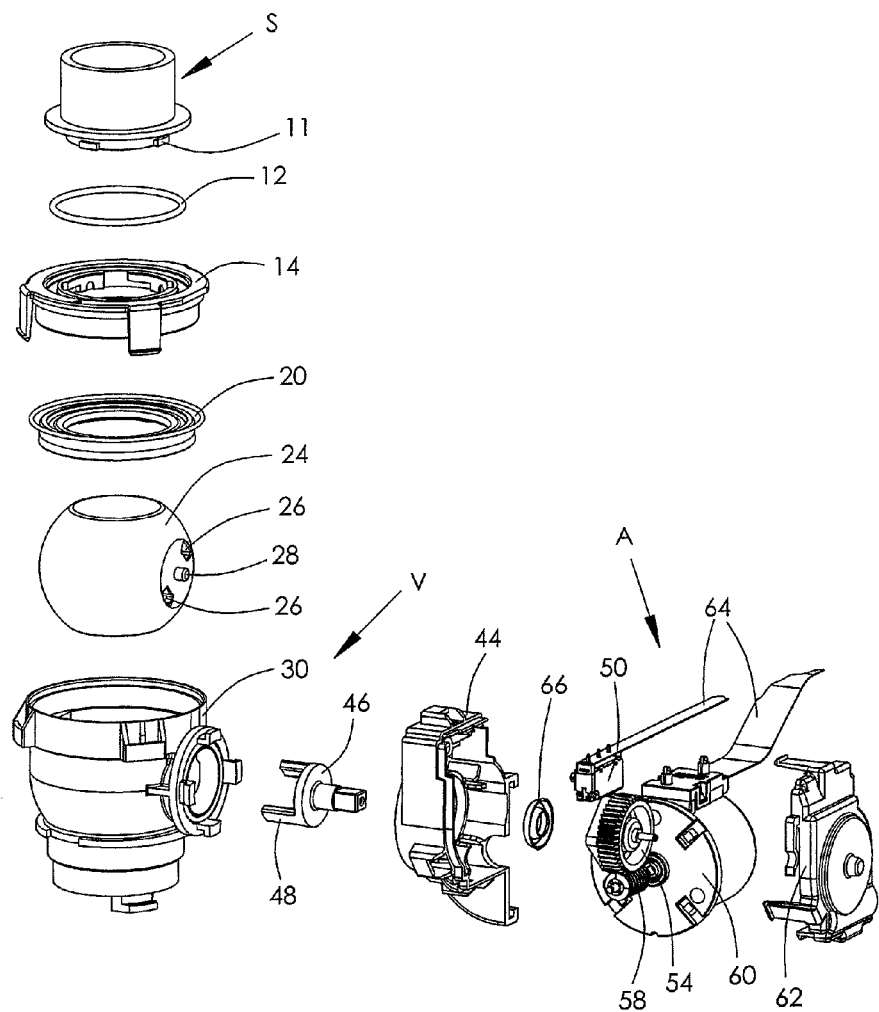
FIG. 1 is an exploded view of a modular gas valve, being a part of a gas meter, according to the preferred embodiment of the present invention.

A first preferred embodiment of the modular gas shut-off valve is illustrated in the exploded view of FIG. 1. The following three modules can be seen: a drive unit marked "A", a valve unit marked "V" and a connection unit marked "S", subsequently also referred to as connection piece. All modules have shape-mated connections to connect the module to at least one other module. The shape-mated connections are preferably either snap-on elements acting against each other and/or bayonet closures. The modules and their individual parts are shown separate from each other in the interest of clarity.

Figure 2:
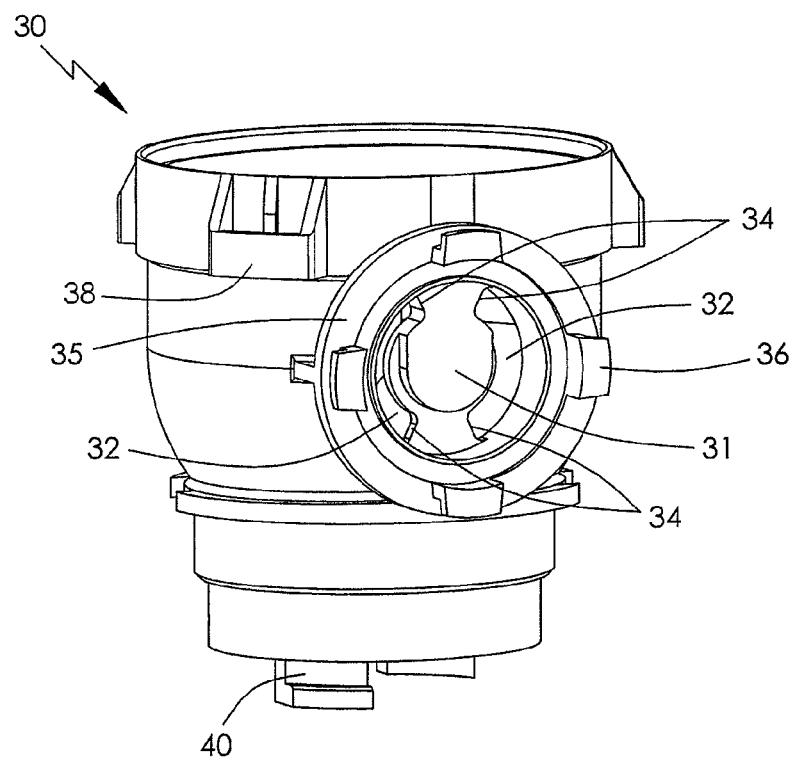
FIG. 2 shows a valve body, being a part of the valve of FIG. 1.

The valve unit "V" has a valve body 30, shown in detail in FIG. 2. The valve body 30 has a side recess 31 with has two openings 32 to accommodate an operating device for moving or operating a valve element 24. Circumferential ends of the openings 32 form stops 34, limiting the movement of the operating device, as will be described later. The valve element 24 is a valve ball in this embodiment, although a cylindrical valve element may be used. A connection adaptor in the form of a protruding collar 35 formed as one piece with the valve body 30 surrounds the side recess 31. Four snap-on elements 36 protruding symmetrically relative to each other are positioned along collar 35.

The valve body has a pathway extending there through from an inlet to an outlet defining a gas flow path. The valve body has three additional closures in the form of snap-on elements 38 on the outer edge of its upper end. Two additional closures in the form of bayonet elements 40 are arranged on the lower end of the valve body. The closures are arranged symmetric to each other, their arrangement and number are variable according to the invention. Through this arrangement of the closures and the compact design of the valve body, three modules (top, bottom and lateral) can be connected to the valve unit V. The valve body 30 is formed in one piece with the closure elements, preferably by injection molding.

Figure 3:
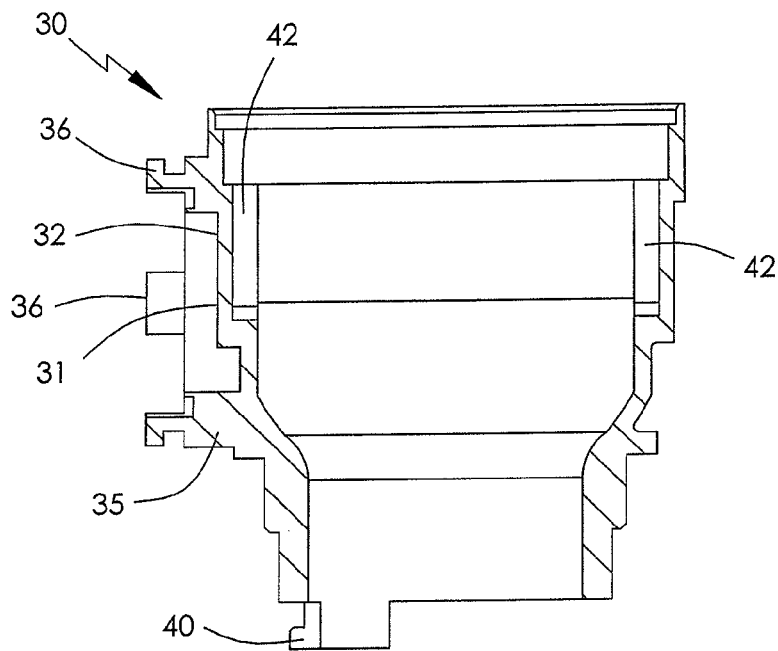
FIG. 3 is a cross sectional view of the valve body of FIG. 2.
Figure 5:
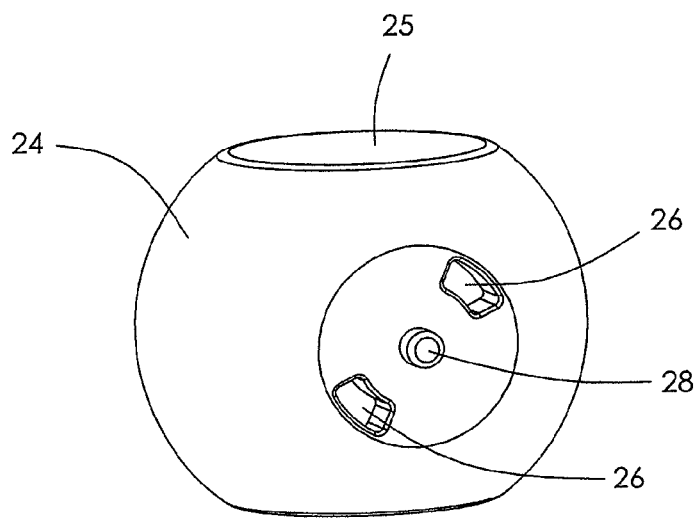
FIG. 5 shows a valve ball, being a part of the valve of FIG. 1.

The inside wall of valve body 30 is shown in detail in the cross-sectional view of FIG. 3. It has two opposite recesses 42 in the form of grooves running vertically to accommodate the two stub axles 28 of the valve ball 24. The two stub axles are designed to be disposed in the recesses 42 to rotatably mount the valve ball. The valve ball 24 and the two stub axles 28 are arranged symmetric with reference to the vertical axis of the valve ball 24 so that stable positioning of the valve ball 24 is possible. The valve ball 24 is shown enlarged in FIG. 5. The valve ball has two symmetrically arranged grooves 26 on a side facing the drive unit A. The two grooves 26 after fitting of the valve ball 24 into the valve body 30 align with the openings 32 in the side recess 31 to facilitate connection of the operating device. The valve ball has a through passage 25 defining a gas flow path through the valve ball, the valve ball being located in the gas flow path of the valve body.

Figure 4:
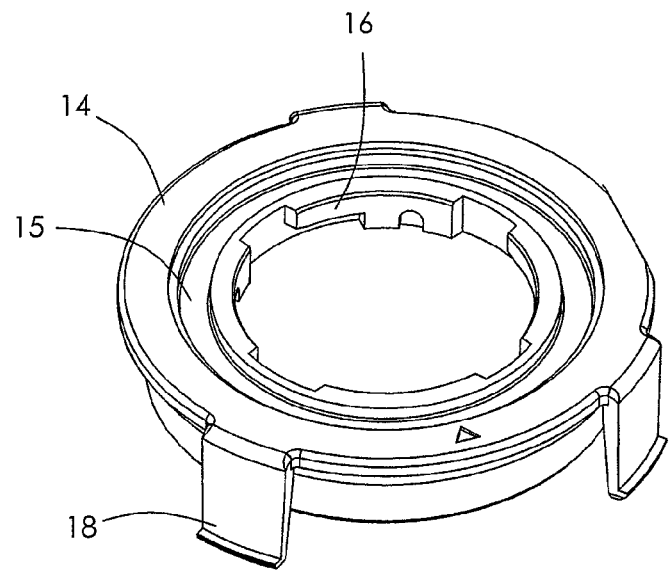
FIG. 4 shows a housing cap, being a part of the valve of FIG. 1.

A housing cap 14 partially closes the upper end of the valve body to capture the valve ball. A sealing element 20 is provided between the valve ball 24 and the housing cap 14. As shown in FIG. 4, the housing cap has closure elements in the form of snap-on elements 18 and bayonet elements 16. The sealing element 20 is arranged to make a sliding seal with the valve ball 24 within the valve body 30 and is compressed between the valve body 30 and the housing cap 14, the housing cap being fixed to the valve body by the shape-mated connection of the snap-on elements 18 of the housing cap with the snap-on element 38 of the valve body. Thus the sealing element 20 is disposed between the housing cap 14 and the valve body 30 and is pressed against the valve ball 24.

Figure 6:
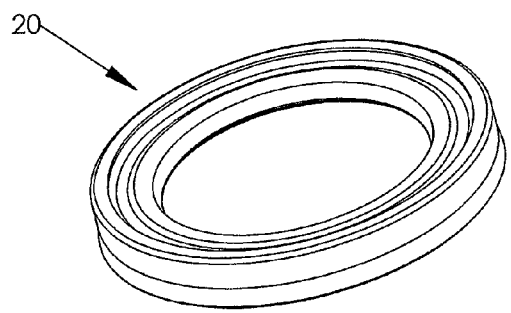
FIG. 6 shows a sealing element, being a part of the valve of FIG. 1.
Figure 7:
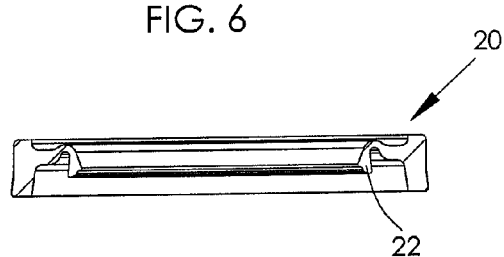
FIG. 7 is a cross sectional view of the sealing element of FIG. 6.

FIGS. 6 and 7 show a perspective view and a cross section of the sealing element 20. The sealing element 20 has a lip seal 22. The inside diameter of the lip seal 22 corresponds to the diameter of the passage 25 through of the valve ball 24 so that the lip of the lip seal 22 can match the opening of the passage. Through this special shape of the sealing element 20 the pressure force is reduced with a simultaneous improvement of robustness relative to tolerance fluctuations and component dimension errors. Because of its geometrically defined flexibility it also offers high long-term stability and optimal tolerance compensation. All this produces a low load torque, lower energy demand of the drive and consequently longer lifetime during battery operation.

Assembly of the entire valve unit "V" is simple. In the first place the valve ball 24 is placed into the valve body 30 through the top opening with the two stub axles 28 fitted into the recesses 42 of valve body. The inside wall of the valve body is shaped to accommodate the valve ball so that no unnecessary friction develops between the inside wall of the valve body and the surface of the valve ball. The sealing element 20 and the housing cap 14 are then positioned from above onto the valve body so that closure of the snap-on elements 18, 38 occurs through a translational movement with the sealing element forming a seal between the valve body and the housing cap as well as being pressed against the valve ball.

In valves known from the prior art the valve ball is mounted on a support arrangement consisting of two O rings that are positioned on the outer peripheral surface of the valve ball, one in front of the valve ball and one behind the valve ball. In the valve according to the present invention, because of the positioning of the valve ball 24 according to the invention, only one sealing element 20 is necessary to seal the valve ball 24, namely the one arranged adjacent to the connection unit S. The valve ball 24 is stably positioned by cooperation of the stub axles 30 and the recesses 42 in the valve body 30.

The connection unit S depicted in FIG. 1 comprises a connection adapter for connecting to a gas line etc. The connection adapter has the elements of a bayonet closure 11 which cooperate with the elements of the bayonet closure 16 of the housing cap 14 of the valve unit V. During connection of the modules of the valve unit V and the connection unit S an O-ring 12 to seal the connection is inserted in between and locates in groove 15 of the housing cap.

Figure 8:
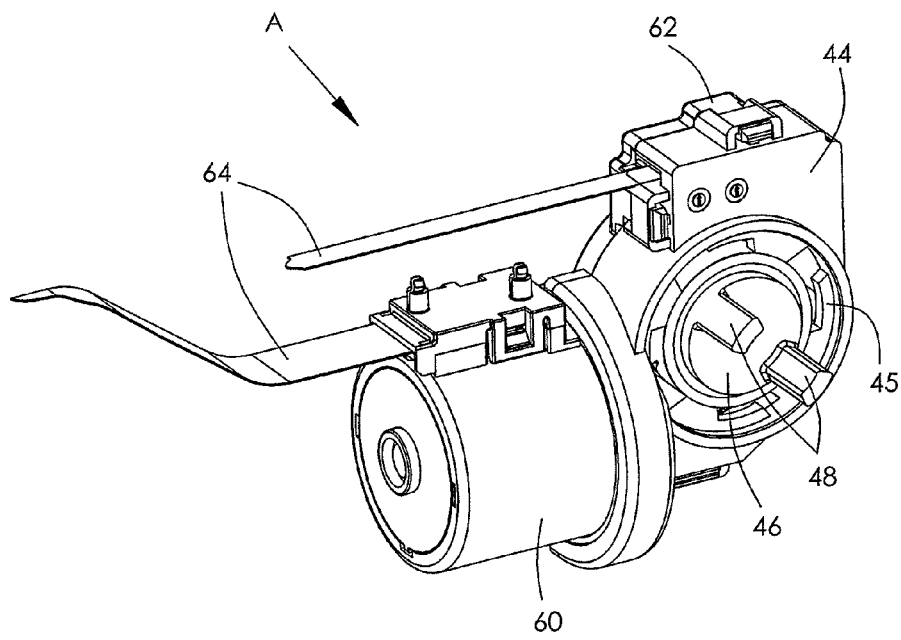
FIG. 8 illustrates a drive unit, being a part of the valve of FIG. 1.

FIG. 8 shows the drive unit A assembled, ready for operation. The drive unit comprises: a gear cover 62, motor 60 with worm 58, a trip cam 56, worm gear 54, switch 50, operating device and gear housing 44. The operating device is referred to hereafter as coupling piece 46.

Figure 9:
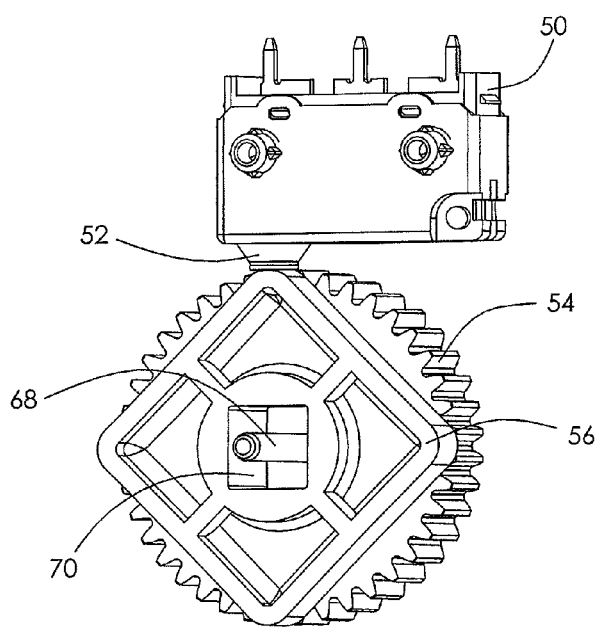
FIG. 9 shows a trip cam and switch, being parts of the valve of FIG. 1.

The worm gear 54 is meshed with the worm 58 such that operation of the motor rotates the worm gear. The worm gear 54, trip cam 56 and switch 50 are shown enlarged in FIG. 9. The trip cam 56 is formed on the worm gear 54. The switch 50 has a pin 52 for operating the switch. The trip cam has a cam surface arranged to contact the pin 52 such that the switch is operated in the open and closed positions of the valve ball.

The gear mechanism includes a worm gear 54 driven by the motor 60 through a worm and is connected to the coupling piece 46. Alternatively, the trip cam 56 may be formed with the coupling piece. The cam surface and the switch being arranged to sense the open and closed positions of the valve element.

The drive unit A of the preferred embodiment uses a single switch 50 and a single trip cam 56, arranged so that the open and closed position of the valve element is recognized by the switch and the motor can be controlled to turn off once the open or closed position is reached. This arrangement of the trip cam is very advantageous, since it leads to a reduction in the number of switches to accomplish position recognition from two, as is used in the prior art, to one.

Figure 10:
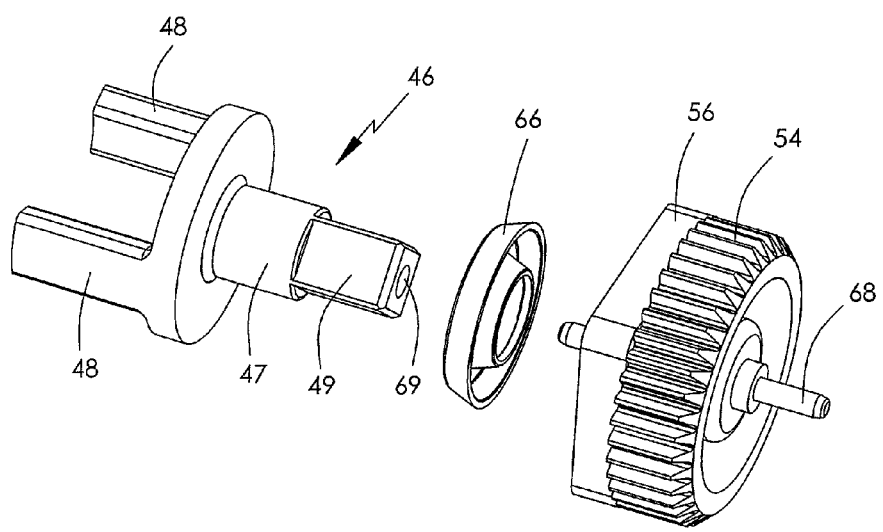
FIG. 10 illustrates a connection between a coupling piece and a worm gear of the drive unit of FIG. 2.

The coupling piece 46, as shown in FIG. 10, comprises a disc portion having two axially extending connectors 48. The disc portion is accommodated in the side recess 31 of the valve body and the connectors 48 extend through the openings 32 and locate within the grooves 26 of the valve element 24 to operate or rotate the valve ball between an open position and a closed position. The openings 32 limit the rotational movement of the connectors 48. The connectors bare against the end stops 34 formed the circumferential ends of the openings at the end of travel, thus limiting the maximum rotational movement of the valve ball.

The coupling piece 46 has a shaft, which engages with a mating piece of the worm gear so as to rotate with the worm gear. The shaft has a square end 49, with an axially extending hole 69. The square end 49 engages a square hole 70 formed in the worm gear and the hole 69 in the end of the shaft accommodates an axle 68 of the worm gear to align and support the coupling piece 46. The shaft also has a cylindrical part 47. A seal 66 is inserted between the gear housing 44 and the cylindrical part 47 of the coupling piece 46 so that no gas flow can develop between the valve unit V and the drive unit A.

By rotation of the coupling piece 46 the valve ball 24 is rotated between the open and closed positions of the valve. The drive unit A is connected to the side recess 31 of the valve body 30 in a modular manner through the shape-mated connection between bayonet elements 36 of the valve unit V and the bayonet elements 45 of the drive unit A. An O-ring seal (not shown) can be inserted between the drive unit A and the valve unit V to prevent gas leakage. The necessary sealing pressure to compress the O-ring seal is achieved by the shape-mated connection.

Optionally, the coupling piece 46 or the worm gear 54 advantageously includes two trip cams 56, configured so that the pin 52 of switch 50 is forced in by the trip cam 56 on coupling 46 or on worm gear 54 both in the open and closed position and issues a signal. Through this configuration of coupling piece 46 with the additional information of the direction of rotation of the valve ball 5 it can be accurately determined whether valve ball 24 is situated in the open or closed position.

The signal from the switch and the power to operate the motor may travel along the flat conductor to a controller or operating unit located outside of the meter housing. As such the flat conductor must pass through the housing, in a fluid-tight manner, to maintain the safety of the gas meter. This is achieved in an embodiment of the present invention by use of a fluid-tight cable bushing to maintain the fluid-tightness and preferably, the explosion resistance of the housing.

Figure 12:
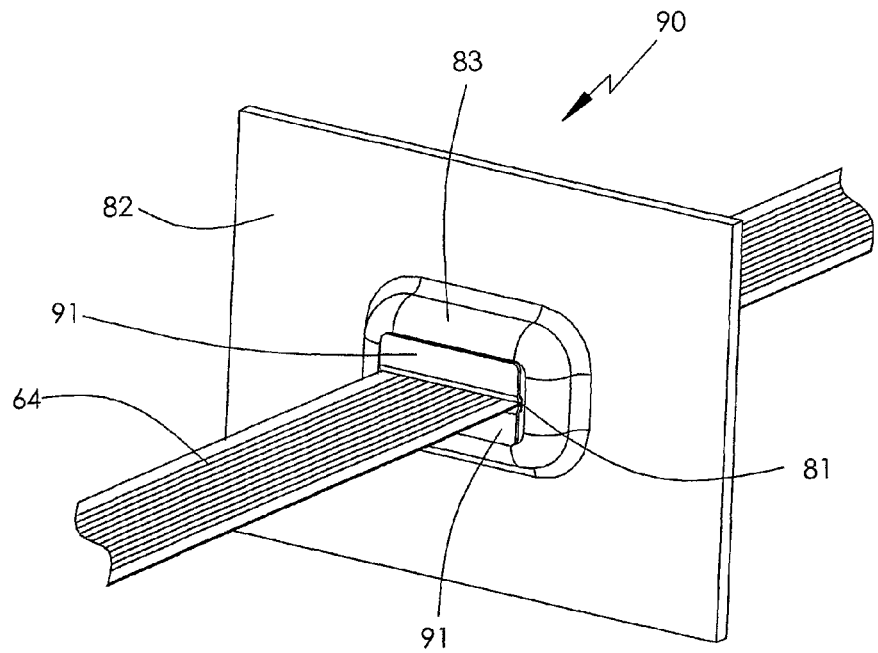
FIG. 12 illustrates a fluid-tight cable bushing, fitted to a housing.
Figure 13:
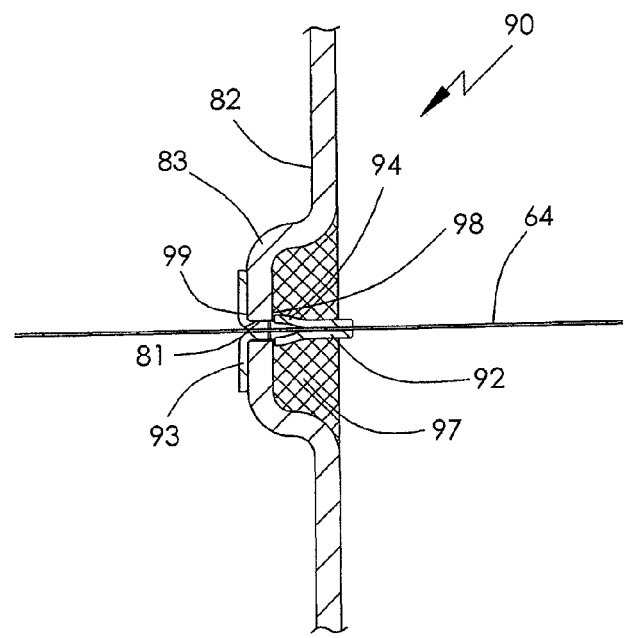
FIG. 13 is a sectional view of the cable bushing of FIG. 12.

FIG. 12 shows a cable bushing 90 according to an embodiment of the present invention, in the installed state in cooperation with a portion of the meter housing 82. The housing has an opening 81 through which the flat conductor 64 passes in a fluid-tight manner. FIG. 13 is a sectional view of the cable bushing of FIG. 12. The fluid-tight cable bushing 90 guides the flat conductor 64, through the opening 81 of the housing. The housing has a recess or shaping 83 forming a depression on a first end 98 of the opening. The cable bushing 90 has two profile supports 91, each having a first flange 92 having a snap-on element 94, and a second flange 93 angled from it. In the installed state the first flanges 92 extend symmetrically to each other in the direction of the longitudinal axis of the flat conductor 64 and enclose the flat conductor sandwich-like on both sides with surface contact. To form a first fixation point the snap-on elements 94 of the first flanges 92 are mounted v-shaped directly on the first end 98 of the opening with the V opening facing the opening 81. In order to form a second fixation point, in the form of a stop surface, the second flanges 93 extend fin-like laterally beyond the second end 99 of the opening 81. In addition, fluid-tight potting mass 97 is provided in the depression to cover the fixation point positioned in the area of the depression. As is apparent, the first flanges 92 of the two profile supports 91 extend beyond the potting mass 97 so that the potting mass is arranged contact-free relative to flat conductor 64 within the depression formed by the recess or shaping 83 of the meter housing 82.

Figure 14:
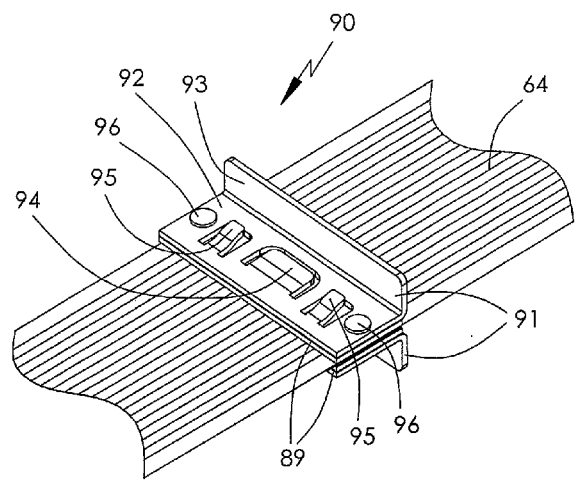
FIG. 14 illustrated a modified cable bushing.

FIG. 14 shows a modified cable bushing 90 before installing in the slot of the housing. In this embodiment a spacer 89 is arranged above and below the flat conductor, between the conductor and the respective profile support 91. Rivets 96 are used to hold the supports, spacers and conductor together. Additional snap-on elements 95 are also provided. Through the use of spacers 38, which can preferably be formed of a fireproof material, the total design height, which is given by the profile supports 91, the flat conductor 64 and the spacers 89, can be changed and adjusted in simple fashion. This is particularly advantageous, since the minimal admissible height of the opening 81 of the housing 82 occurs through a stamping process dependent on the thickness of the housing. The rivets 96 ensure reliable holding between the flat conductor 64, spacers 89 and the profile supports 91, especially during installation. Alternatively, glue may be used to replace or in addition to the rivets. The second snap-on elements 95 are located at different longitudinal spacings compared with the first snap-on elements and thus have different spacings to the second flange 93 to enable use with housings of different thicknesses. The first snap-on element 94 is provided for a thinner housing where the second snap-on elements would not make contact with the housing. For a housing with a greater thickness, only the second snap-on elements 95 would engaged with the end of the opening 81 and the first snap-on elements are not engaged and remain inside the opening 81.

Optionally, the stop surface of the second flanges may serve as a glue surface on the housing. The stop surface can be provided with sealing material, which completely closes the opening 22 after installation and ensures gas-tightness without the use of potting mass 34.

Figure 15:
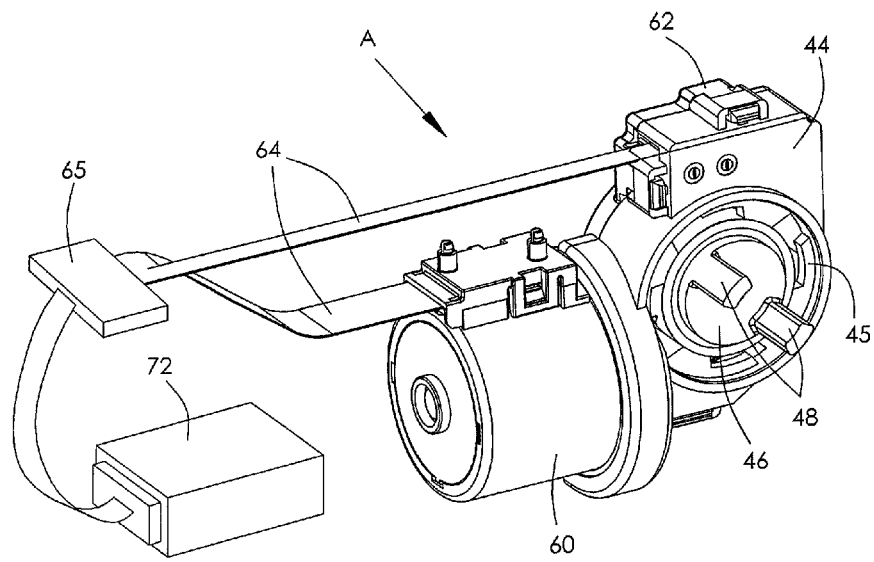
FIG. 15 illustrates a drive unit, incorporating additional electronic components.

To avoid the need for cables to pass through the housing of the gas meter, the switch and the motor may be connected to a wireless device 65, as shown in FIG. 15. The flat conductor 64 is connected at one end to the switch 50 and to the motor 60. The wireless device 65, such as a wireless receiver or receiver/transmitter, is connected to the other end of the flat conductor 64. Alternatively, the wireless device may be integrated with the flat conductor. Thus signals can be exchanged between the switch and the motor and an outside controller or monitor without having any cables extending through the housing of the meter to ensure gas tightness. Alternatively, the motor controller may be integrated with the electronics of the wireless receiver such that the outside controller sends signals to the meter, for example to open or close the gas valve and the motor controller, located within the meter housing turns on the motor in accordance with the instructions and the switch is used by the motor controller to recognize that the valve has been correctly operated and turn off the motor. In this arrangement, the motor is battery operated with a battery 72 also located within the meter housing. The battery providing power for the motor as well as the electronics forming the motor controller and the wireless receiver. In this arrangement, the wireless device may be a simple wireless receiver if feedback to the outside controller is not required. Alternatively, the wireless device may be a wireless receiver and transmitter providing feedback from the switch, indicating the status of the gas valve.

It is apparent from the above outline of the invention that the gas valve according to the invention represents an autonomous, compact valve relative to ordinary gas valves, which has an optimal relation between size, flow rate, energy consumption and pressure loss and can be manufactured more simply and cost-effectively.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A gas meter with integrated gas shut-off valve comprising:
   a housing, having a gas inlet and a gas outlet,
   a gas flow meter mechanism, and
   a gas shut-off valve comprising a valve unit, a drive unit having a motor and a connection unit connected to the valve unit, the meter mechanism and the shut-off valve with the valve unit, drive unit having the motor and the connection unit being arranged in a gas flow path between the gas inlet and the gas outlet,
   wherein the gas shut-off valve is an electrically operated valve with a spherical or cylindrical valve element, and
   wherein the valve unit further comprises a valve body and only one lip seal configured to seal the valve element to the valve body.

2. The gas meter of claim 1, comprising an internal power supply, in the form of a battery, for autonomous operation of the gas meter.

3. The gas meter of claim 1, further comprising a wireless receiver or a wireless receiver and transmitter, which exchange information with a wireless receiver and/or wireless transmitter situated outside the gas meter, to enable wireless communication and control of the gas meter.

4. The gas meter of claim 3, wherein electronic components for the wireless receiver and/or transmitter are arranged directly on a flat conductor or integrated in it.

5. The gas meter of claim 1, wherein the valve element is rotatably mounted in the valve body, the valve body defining at least one elongated opening with two opposite ends, the drive unit comprising at least one connector extending through the at least one opening to connect to the valve element, the at least one connector being capable of moving along the elongated opening between the two opposite ends to thereby rotate the valve element between an open position and a closed position.

6. The gas meter of claim 5, wherein the valve body defines at least one groove aligning with the at least one opening, the at least one connector extending through the opening and locate within the grooves of the valve element for rotating the valve element between an open position and a closed position.

7. The gas meter of claim 1, wherein the units are connectable to each other in modular fashion and separable from each other.

8. The gas meter of claim 7, wherein the drive unit has a coupling piece having two connectors for driving the valve element and the valve body has two openings through which the two connectors extend to engage the vale element in shape-mated manner, the openings being arranged to form stops for the connectors preventing rotation of the valve element beyond 90°.

9. The gas meter of claim 7, wherein at least one of the valve body and the valve element is made from plastic.

10. The gas meter of claim 7, wherein the drive unit has a gear mechanism, which is connected as a modular unit with the valve body after connection of the valve element with the drive unit.

11. The gas meter of claim 10, wherein the gear mechanism comprises a worm fitted to a shaft of the motor, and a worm gear in mesh with the worm.

12. The gas meter of claim 7, wherein the drive unit has a switch and at least one trip cam arranged to operate the switch to recognize the open and closed position of the valve element.

13. The gas meter of claim 12, wherein the motor and the switch of the drive unit (A) are connected with a flat conductor.

14. The gas meter of claim 13, wherein the flat conductor has electronic components that prevent the formation of an igniting spark.

15. The gas meter of claim 13, wherein the flat conductor extends through an opening in an outer wall of the housing and the opening is sealed by a fluid-tight cable bushing.

16. A gas meter with integrated gas shut-off valve comprising:
   a housing, having a gas inlet and a gas outlet,
   a gas flow meter mechanism, and
   a gas shut-off valve, the meter mechanism and the shut-off valve being arranged in a gas flow path between the gas inlet and the gas outlet,
   wherein the gas shut-off valve is an electrically operated valve with a spherical or cylindrical valve element;
   wherein the gas shut-off valve has a valve unit (V) comprising a valve body and a sealing element disposed therein, a drive unit (A) having a motor, and a connection unit (S), units (V, A, S) being connectable to each other in modular fashion and separable from each other;
   wherein the drive unit (A) has a switch and at least one trip cam arranged to operate the switch to recognize the open and closed position of the valve element;
   wherein the motor and the switch of the drive unit (A) are connected with a flat conductor which extends through an opening in an outer wall of the housing and the opening is sealed by a fluid-tight cable bushing; and
   wherein the opening has a shaping forming a depression on a first end of the opening, the fluid-tight cable bushing passes through the opening and comprises two profile supports with a first flange having snap-on elements and a second flange angled from it, in which in the assembled state:

a. the first flanges of the profile supports extend symmetric to each other in the direction of the longitudinal axis of the flat conductor and enclose the flat conductor sandwich-like on both sides with surface contact;

b. to form a first fixation point the snap-on elements of the first flange are mounted v-shaped with the V opening pointing towards the opening and snapped directly onto the first end of the opening;

c. to form a stop surface the second flanges of the profile supports extend fin-like laterally beyond a second end of the opening; and d. a fluid-tight potting mass covers the fixation point positioned in the area of the depression.

17. The gas meter of claim 16, wherein each first flange of the fluid-tight cable bushing has more than one snap-on element to form at least one additional fixation point.

18. The gas meter of claim 16, wherein the fluid-tight cable bushing has spacers to vary the design height of the cable bushing and to protect the flat conductor, the spacers are fixed to the first flanges and the flat conductor by connection elements and/or glue.

* * * * *